(12) United States Patent
Imhoff

(10) Patent No.: US 8,296,878 B2
(45) Date of Patent: Oct. 30, 2012

(54) LOCKING SAFETY MECHANISM FOR SUSPENDED TRANSPORT APPARATUS

(76) Inventor: Karl Imhoff, Muskego, WI (US)

( * ) Notice: Subject to any disclaimer, the term of this patent is extended or adjusted under 35 U.S.C. 154(b) by 384 days.

(21) Appl. No.: 12/567,959

(22) Filed: Sep. 28, 2009

(65) Prior Publication Data

US 2011/0072580 A1 Mar. 31, 2011

(51) Int. Cl.
*A61G 7/10* (2006.01)
(52) U.S. Cl. ............. 5/85.1; 188/43; 212/329; 414/921
(58) Field of Classification Search .............. 5/81.1 R, 5/83.1, 85.1, 89.1, 510, 511; 104/91, 94, 104/95; 188/41–44; 212/329; 414/921
See application file for complete search history.

(56) References Cited

U.S. PATENT DOCUMENTS

| | | | |
|---|---|---|---|
| 130,977 A | 9/1872 | Campbell | |
| 1,411,865 A | 4/1922 | Moors | |
| 1,471,657 A | 10/1923 | Hampton | |
| 2,326,377 A | 8/1943 | McBride | |
| 2,435,418 A | 2/1948 | Wright | |
| 3,200,768 A | 8/1965 | Harrison | |
| 3,314,378 A | 4/1967 | Potter et al. | |
| 3,354,834 A | 11/1967 | Orwin | |
| 3,357,369 A | 12/1967 | Dehne | |
| 3,397,650 A | 8/1968 | Kondur et al. | |
| 3,548,752 A | 12/1970 | Karlstrom | |
| 3,572,471 A * | 3/1971 | Martelee | 188/144 |
| 3,759,189 A | 9/1973 | Desilets | |
| 3,800,710 A | 4/1974 | Raoulx | |
| 3,807,532 A | 4/1974 | Molt | |
| 3,842,892 A | 10/1974 | Stieler | |
| 3,986,458 A | 10/1976 | Kling | |
| 3,995,561 A | 12/1976 | Allor, Jr. | |
| 4,326,466 A | 4/1982 | Parry et al. | |

(Continued)

FOREIGN PATENT DOCUMENTS

SU 468845 4/1975

(Continued)

OTHER PUBLICATIONS

Excerpts of PCT International Search Report and Written Opinion for PCT/US2010/02524. 4 pages. Date: Nov. 3, 2010.

*Primary Examiner* — Robert G Santos
*Assistant Examiner* — Nicholas Polito
(74) *Attorney, Agent, or Firm* — Jansson Shupe & Munger Ltd.

(57) ABSTRACT

A suspended patient-carrier/transport apparatus of the type including an overhead rail forming a horizontal track terminating at a track-end, and a carrier device supported by a carriage having a plurality of aligned rollers rideable along the track. The inventive suspended transport apparatus has a locking safety mechanism including the carriage having a main carriage portion and a forward carriage portion. A track-end detector is at the forward carriage portion and movably secured with respect thereto such that the track-end detector moves downwardly when it runs beyond the track-end. A locking device is operatively connected with respect to the track-end detector such that downward movement thereof causes the locking device to engage the rail thereby stopping the carriage on the track.

20 Claims, 7 Drawing Sheets

U.S. PATENT DOCUMENTS

| | | |
|---|---|---|
| 4,372,452 A | 2/1983 | McCord |
| 5,046,588 A | 9/1991 | Boben |
| 5,180,036 A | 1/1993 | Boben |
| 5,202,539 A | 4/1993 | Lamb |
| 5,217,091 A | 6/1993 | Shiina et al. |
| 5,320,211 A | 6/1994 | Sugiura |
| 5,884,564 A | 3/1999 | Fountas |
| 6,315,089 B1 | 11/2001 | Fink et al. |
| 6,318,507 B1 | 11/2001 | Jin |

FOREIGN PATENT DOCUMENTS

| | | |
|---|---|---|
| SU | 701879 | 12/1979 |

\* cited by examiner

LOCKING SAFETY MECHANISM FOR SUSPENDED TRANSPORT APPARATUS

FIELD OF THE INVENTION

The present invention relates to hoisting devices for handling patients. More specifically, to rail-suspended patient-handling devices and safety features for such device.

BACKGROUND OF THE INVENTION

The industry of patient lifts has grown exponentially over the past few years. Initially, such devices were primarily located in homes of disabled people. Presently, patient lifts are placed in hospital rooms, physical therapy centers, senior centers and other similar facilities nationwide. Along with the growth of the patient-lift industry, much improvements have been made to the patient-lift devices themselves to better serve needs of disabled individuals and their care givers.

The evolution of patient lifts went through a number of stages. The earliest patient lifts are secured to a single overhead track with bumper end-stops at the end of the track. Such single track runs from a position over a bed to a bathroom. These early patient lifts are either manually pushed along the track or powered by a motorized roller assembly. Later systems have tracks with switch assemblies to allow service for more than one bed or to provide access to multiple destinations such as the toilet and shower and the like.

Next generation is room-covering units including tracks located along opposite sides of the room with a perpendicular track therebetween. These units are equipped with rollers for riding the two tracks along opposite sides of the room with the patient lift mounted on the perpendicular track allowing for X and Y-direction coverage of the entire room.

The room-covering units have been further improved to include a switch gear at one or both ends of the perpendicular track. Such switch-gear end of the perpendicular track has been designed for engagement with another fixed track at the threshold of an adjacent room. The engagement occurs when an aligned mechanically-operated switch is pressed to mechanically engage a lock assembly and open the "gates" at the end of the perpendicular track. A fixed-threshold track (combi-lock) holds both engaging tracks in alignment to allow a transition of the patient-lift device into another room which usually has a similar room-covering track unit for full access to the adjacent room.

The most immediate need for a mechanical safety device has been created by the introduction of room-covering units that include combi-lock assemblies for traveling through a threshold to another room. If a failure of such device occurs while not in alignment with another track, the patient-lift device would be free to fall off the end of the track. This may result in a potentially catastrophic event for a suspended patient supported by the patient-lift device dropping the patient and having the unit fall on top of either the patient or an assistant or both. There is a need for a substantially failproof safety means preventing patient-lift devices from falling off the tracks.

In the earlier versions of the patient-lift devices secured to a single overhead track with bumper end-stops at the track ends, the bumper end-stops are bolted in a sandwich fashion which has been recognized as insufficient. In the past few years, these bumper end-stops have been required to be additionally pinned. However, any such attachment is removable and, if not present, could cause the same possible catastrophic situation.

While in the full-room covering units with a perpendicular track movable along two side tracks there is no danger of the patient-lift device falling off the perpendicular seamless track, the side tracks have only bumper stops at their ends. Therefore, if a failure occurs, the perpendicular track along with the patient-lift device may fall off the failed end of the side track resulting in the same unfortunate situation as above.

It is clear that any increase in safety to the public, particularly disabled patients, is always desirable and welcome. It is, therefore, desirable to equip patient-lift systems with safety means designed to arrest motion of the patient-lift devices at the end of an open track to prevent falling of the device off the track.

It is further desirable to have a safety device that would recognize presents of the track in front of a moving portion of the patient-lift system. Such safety device would be imperative for public and patient safety and would greatly further the evolution of the patient-lift young industry.

OBJECTS OF THE INVENTION

It is an object of the invention to provide an improved suspended patient-carrier/transport apparatus overcoming some of the problems and shortcomings of the prior art, including those referred to above.

Another object of the invention is to provide a suspended patient-carrier/transport apparatus with a substantially failproof safety means preventing patient-lift devices from falling off the tracks.

Another object of the invention is to provide a suspended patient-carrier/transport apparatus with a safety means designed to arrest motion of the patient-lift devices at the end of an open track to prevent falling of the device off the track.

Still another object of the invention is to provide a suspended patient-carrier/transport apparatus with a safety devise that would recognize the presents of a track in front of a moving portion of the apparatus.

How these and other objects are accomplished will become apparent from the following descriptions and the drawings.

SUMMARY OF THE INVENTION

The present invention is an improvement in suspended patient-carrier/transport apparatus which includes an overhead rail forming a horizontal track which terminates at a track-end. In such suspended patient-carrier/transport apparatus, a carrier device is supported by a carriage having a plurality of aligned rollers rideable along the horizontal track. The inventive suspended patient-carrier/transport apparatus includes a locking safety mechanism which prevents the carriage from running off the track through a recognition of the track-end.

The locking safety mechanism includes the carriage having a main carriage portion along the track and a forward carriage portion. A track-end detector at the forward carriage portion is movably secured with respect thereto such that the track-end detector moves downwardly when it runs beyond the track-end. A locking device operatively connected with respect to the track-end detector such that downward movement of the detector causes the locking device to engage the rail thereby stopping the carriage on the track.

The forward carriage portion is preferably vertically movable with respect to the main portion. The forward carriage portion may be pivotably secured with respect to the main portion. There also may be other arrangements permitting downward movement of the forward carriage portion with respect to the main portion. The track-end detector is preferably one of the aligned rollers, such aligned roller being preferably a front roller secured to the forward carriage portion such that the forward carriage portion pivots or drops vertically downwardly when the front roller runs beyond the track-end. The locking device is preferably operatively connected with respect to the forward carriage portion such that downward pivoting of the forward carriage portion causes the locking device to engage the rail thereby stopping the carriage on the track.

It is preferred that the locking device presses against the rail with increasing force as the main carriage portion moves forward with the front roller beyond the track-end. Such frictional engagement, of course, is very useful in retrofitting existing suspended apparatuses. However, there may be many other engagement arrangements between the locking device and the rail. Some alternative embodiments, including those for newly manufactured suspended carrier/transport apparatuses, may have the rail of a special construction adapted for engagement by the locking device. Some of such possible rail configurations may include ribbed or perforated surfaces with the locking device configured to engage such ribs or perforations for stopping the carriage on the track.

The track includes top and bottom surfaces. In some embodiments of the present invention, the locking device presses against the bottom track surface opposite to the top surface supporting the rollers.

Alternatively, the locking device may press against or otherwise engage any other surface of the rail, including the roller-supporting top surface of the track, a top interior surface above the rollers as well as interior or exterior of sidewalls of the rail, depending on the rail construction.

In some preferred embodiments, the locking device includes a gripping member pivotally secured with respect to the carriage such that in its non-use position the gripping member is free of engagement with the rail. The locking device preferably includes a lever operatively connected to the gripping member for pivoting thereof against the rail when the front roller runs beyond the track-end. The lever may be pivotally secured with respect to the forward carriage portion.

Alternatively, the lever may extend from a first end pivotally connected with respect to the gripping member to a free end positioned adjacent the forward carriage portion. In such embodiments, an actuator is preferably secured with respect to the forward carriage portion such that in a non-use position the actuator is substantially spaced from the lever free end. When the front roller runs beyond the track-end, downward movement of the forward carriage portion causes the actuator to engage the lever free end to move the lever for pivoting the gripping member into engagement with the rail. It is preferred that once the gripping member engages the rail, there is no need for the lever or the actuator to apply any additional force on the gripping member. The gripping member preferably continues to self tighten against the rail.

It is further preferred that the gripping member have a serrated gripping edge therealong. The gripping edge preferably extends progressively farther from the gripping-member pivot axis in the forward direction. Such serrated edge increases the gripping-member frictional engagement of the rail.

The gripping member further preferably includes a crossbar affixed to the gripping member and extending therefrom for engagement by the lever. The crossbar is preferably offset from the gripping-member pivoting axis. When the downward pivot of the forward carriage portion actuates lever movement, the lever engages the crossbar to pivot the gripping member against the rail. In some embodiments, the actuated lever moves toward the gripping member and pushes the crossbar to pivot the gripping member. Alternatively, the actuated lever may move away from the gripping member and pull the crossbar to pivot the gripping member. The locking device may include a pair of axially-aligned gripping members interconnected by the crossbar, one gripping member on each side of the lever.

The rail may include an elongate interior with a horizontal bottom wall defining a slot therethrough and forming two interior tracks spaced by the slot with the carrier device connected to the carriage through the slot. The carriage preferably includes aligned pairs of interconnected rollers, each roller of one pair rideable along one of the spaced interior tracks. The pair of axially-aligned gripping members is preferably pivotally secured with respect to the carriage for engagement with each track. In there non-use position, the gripping members are preferably free of engagement with the rail.

In some embodiments, the lever is pivotally secured with respect to the forward carriage portion and operatively connected to the gripping members for pivoting thereof against the rail when the front roller runs beyond the track-end.

The carriage may have two of the forward portions, one on each end of the carriage. In such embodiments, the locking device is operatively connected with respect to each of the forward portions such that downward pivoting of one of the forward portions causes the locking device to engage the rail thereby stopping the carriage on the track. Such locking device may include two gripping members each activated by one of the forward portions.

Alternatively, the locking device may have only one gripping member configured to engage the rail in response to downward pivoting of either one of the forward portions when its respective front roller runs beyond the track-end. The locking device of such embodiment preferably includes the lever which is operatively connected with respect to the gripping member and is positioned for actuation by the forward carriage portion to pivot the gripping member against the rail when the front roller runs beyond the track-end.

Such lever preferably extends substantially along the rail from the gripping member to a free end positioned adjacent the forward carriage portion. It is preferred that this lever be formed of two parts each extending from a first end secured with respect to the gripping member to a free second end adjacent the corresponding forward carriage portion. First ends of both lever parts are preferably pivotally secured to the gripping member about a common pivot axis.

The locking device of such embodiments further preferably includes an actuator secured with respect to the forward portion. Downward pivoting of the forward carriage portion, when the front roller runs beyond the track-end, causes the actuator to move the lever free end for pivoting the gripping member into engagement with the rail. In a non-use position, the actuator is substantially spaced from the lever longitudinal axis to avoid interference with the lever movement in response to downward pivot of the opposite forward portion.

The main portion of the carriage may include two movably interconnected sub-portions to permit movement flexibility for the suspended transport apparatus. In the embodiments just described, the locking device includes a gripping-member support structure secured with respect to both carriage sub-portions. The support structure is preferably mounted with respect to each sub-portion with a flexible fastener for added flexibility and resilience of such mounting. The flexible fastener may be a rubber grommet or other similar fastener known in the art.

The gripping-member support structure preferably has a substantially vertical wall extending through the slot between the tracks. A gripping-member pivot axle preferably extends from the vertical wall. The pivot axle may extend from both sides of the vertical wall to support two gripping members one on each side of the vertical wall.

It is further preferred that the locking safety mechanism further include a reinforcing member disposed on an opposite side of the rail from the gripping member such that the rail may be sandwiched between the reinforcing member and the locking device. In other words, the reinforcing member and the locking device are positioned at the rail surfaces facing in opposite directions. The reinforcing member may be in the form of a bar extending substantially across the respective rail surface. Alternatively, the gripping-member support structure may include a substantially horizontal wall extending across an upper or lower edge of the vertical wall. Such horizontal wall is preferably configured and arranged to serve as the reinforcing member. During normal operation of the transport apparatus with all rollers on the track, the reinforcing member extends along the rail and is spaced therefrom for riding therealong.

While such sandwiching of the rail may not be necessary or possible for all applications, it is preferred that the locking engagement continues to increase with the carriage forward movement with the front roller beyond the track.

In the embodiments with the gripping member positioned to engage a bottom surface of the rail, a distance between the bottom surface of the rail and the gripping-member pivot axis depends on the presence of a roller adjacent to the gripping member. Typically, the rollers are made with a plastic material which, after extended period of time and repetitive use, may become brittle increasing chances for partial or complete breakage. The breakage of the roller adjacent to the gripping member would result in a distance between the bottom surface of the rail and the gripping-member pivot axis to exceed the reach of the gripping member. As a result, the gripping member could remain out of engagement with the rail even if actuated by the front roller running off the track. This may lead to a greatly undesirable and dangerous occurrence of the entire suspended transport apparatus riding off the track. Reinforcing member ensures that such disablement of the locking safety mechanism does not happen. When the gripping member is actuated by the downward movement of the carriage forward portion, the reinforcing member serves as counteracting force against the opposite side of the rail such that the rail becomes sandwiched between the reinforcing member and the gripping member. Such counteraction maintains the distance between the gripping member and the rail no grater than the dimension of the gripping-member reach for ensuring its engagement with the rail to stop the carriage on the track regardless of the adjacent-roller presence.

In the embodiments with the gripping member positioned to engage a top surface of the rail, the presence of the reinforcing member provides greater degree of the rail engagement to stop the carriage on the track. Such increased engagement is due to sandwiching of the rail between the reinforcing member and the locking-device gripping member.

It should be understood that, while the present invention is primarily concerned with improving safety in suspended carrier apparatuses for transporting temporarily or permanently disabled persons such as hoisting devices for lifting patients or in residential setting, this invention may also be used with a wide variety of suspended transport apparatuses in many applications. Such applications may include industrial assembly lines such as in automotive manufacturing. This invention may also find its use in other suspended transport systems like funiculars or a variety of rail-utilizing attraction devices.

DETAILED DESCRIPTION OF PREFERRED EMBODIMENTS

Figure 1:
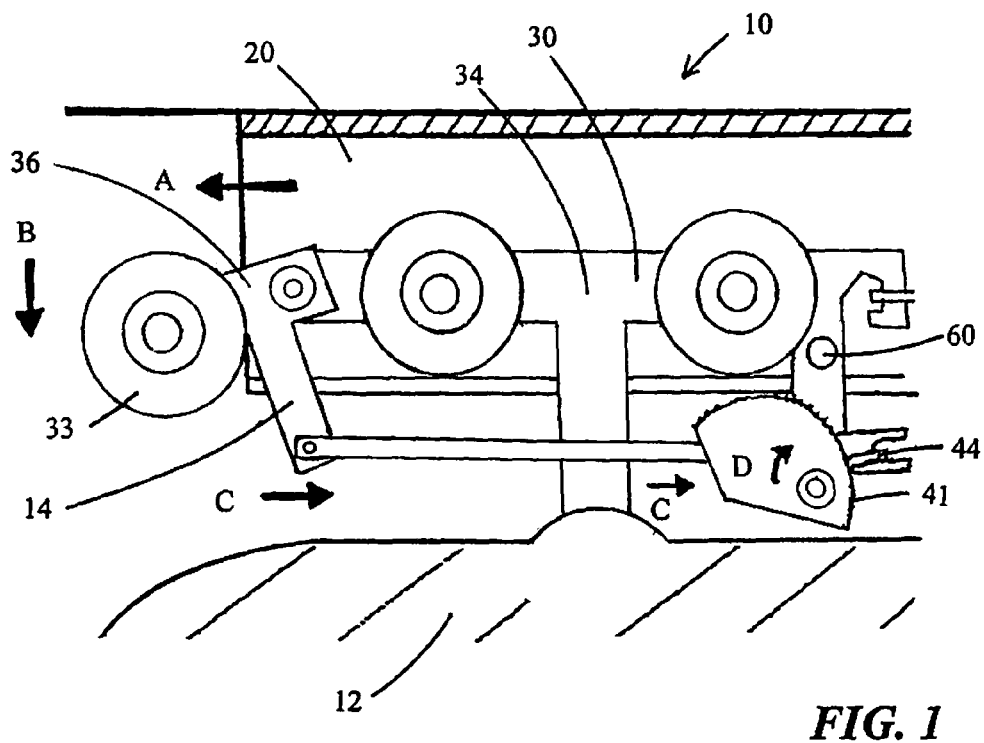
FIG. 1 is a side elevation of a fragment of one embodiment of the inventive suspended transport apparatus with a front roller beyond the track-end.
Figure 2:
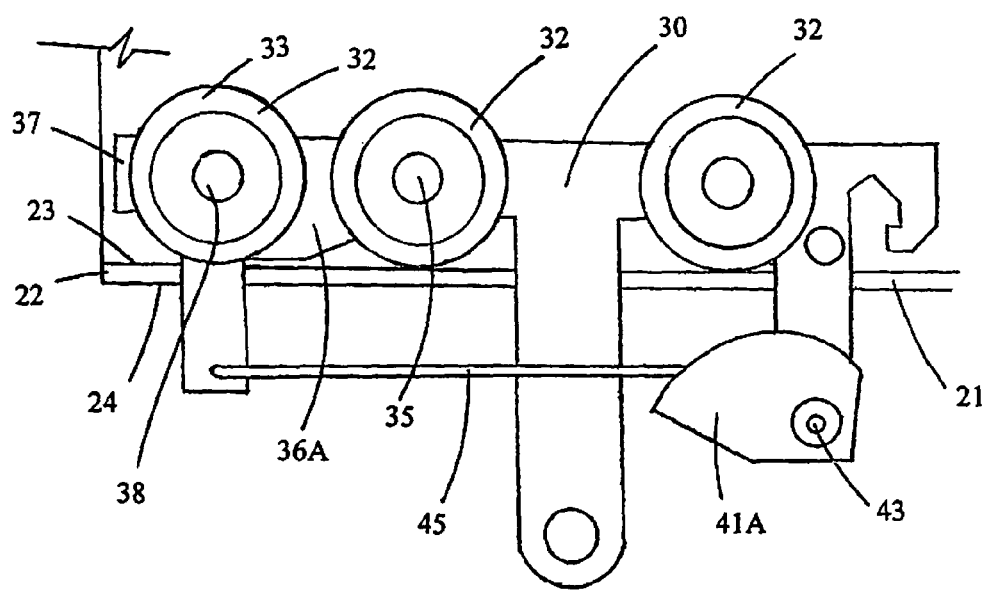
FIG. 2 is a side elevation of a fragment of the transport apparatus similar to the embodiment of FIG. 1 and showing all rollers on the track.

The FIGURES illustrate the improvement in suspended patient-carrier/transport apparatus 10 which includes an overhead rail 20 forming a horizontal track 21 which terminates at a track-end 22. FIGS. 1 and 2 best show a carrier device 12 supported by a carriage 30 having a plurality of aligned rollers 32 rideable along horizontal track 21. Suspended patient-carrier/transport apparatus 10 includes a locking safety mechanism 14 which prevents carriage 30 from running off track 21 through a recognition of track-end 22.

FIGS. 1-5 show locking safety mechanism 14 as including carriage 30 having a main carriage portion 34 which is movable along track 21 and a forward carriage portion 36 vertically movable with respect to main portion 34. FIG. 1, 3 show forward carriage portion 36 pivotably secured with respect to main portion 34. At least one of the aligned rollers 32 is a front roller 33 secured to forward carriage portion 36. FIG. 1 best illustrates that when front roller 33 runs beyond track-end 22, as indicated by arrow A, forward carriage portion 36 pivots downwardly, as indicated by arrow. There also may be other arrangements permitting downward movement of the forward carriage portion with respect to the main portion. One of such arrangements may be a slidable engagement (not shown) between the main carriage portion and the forward carriage portion. In such slidable arrangement, when the front roller runs beyond the track-end, the front carriage portion is allowed to drop or slide down with respect to the main carriage portion.

Figure 3:
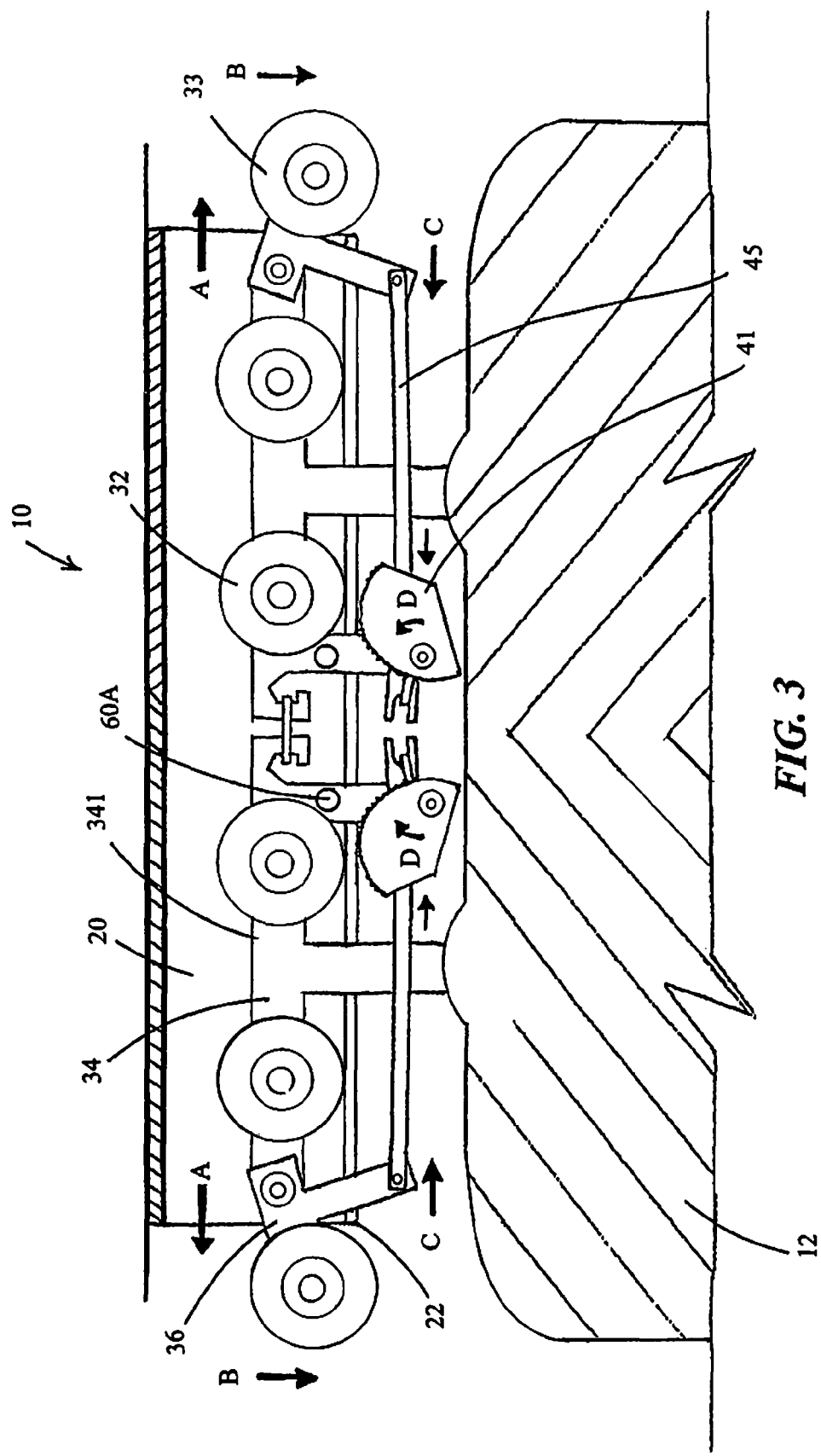
FIG. 3 is a side elevation of the inventive transport apparatus with a forward carriage portion at each carriage end and a locking device having two gripping members. For illustrative purpose, each gripping member is shown actuated by one of the forward carriage portions.

A locking device 40 (best seen in FIGS. 6 and 7) is operatively connected with respect to forward carriage portion 36. As seen in FIGS. 1 and 3, downward pivoting of forward carriage portion 36 causes locking device 40 to engage rail 20 by friction engagement against the track surface. Such engagement stops carriage 30 on track 21. As seen in FIGS. 1 and 3, locking device 40 is configured to press against rail 20 with increasing force as main carriage portion 34 moves forward with front roller 33 already beyond track-end 22. While such frictional engagement is very useful in retrofitting existing suspended apparatuses, there may be many other engagement arrangements between the locking device and the rail. Some alternative embodiments, including those for newly manufactured suspended carrier/transport apparatuses, may have the rail of a special construction adapted for engagement by the locking device. Some of such possible rail configurations may include ribbed or perforated surfaces with the locking device configured to engage such ribs or perforations (not shown) for stopping the carriage on the track.

Figure 5:
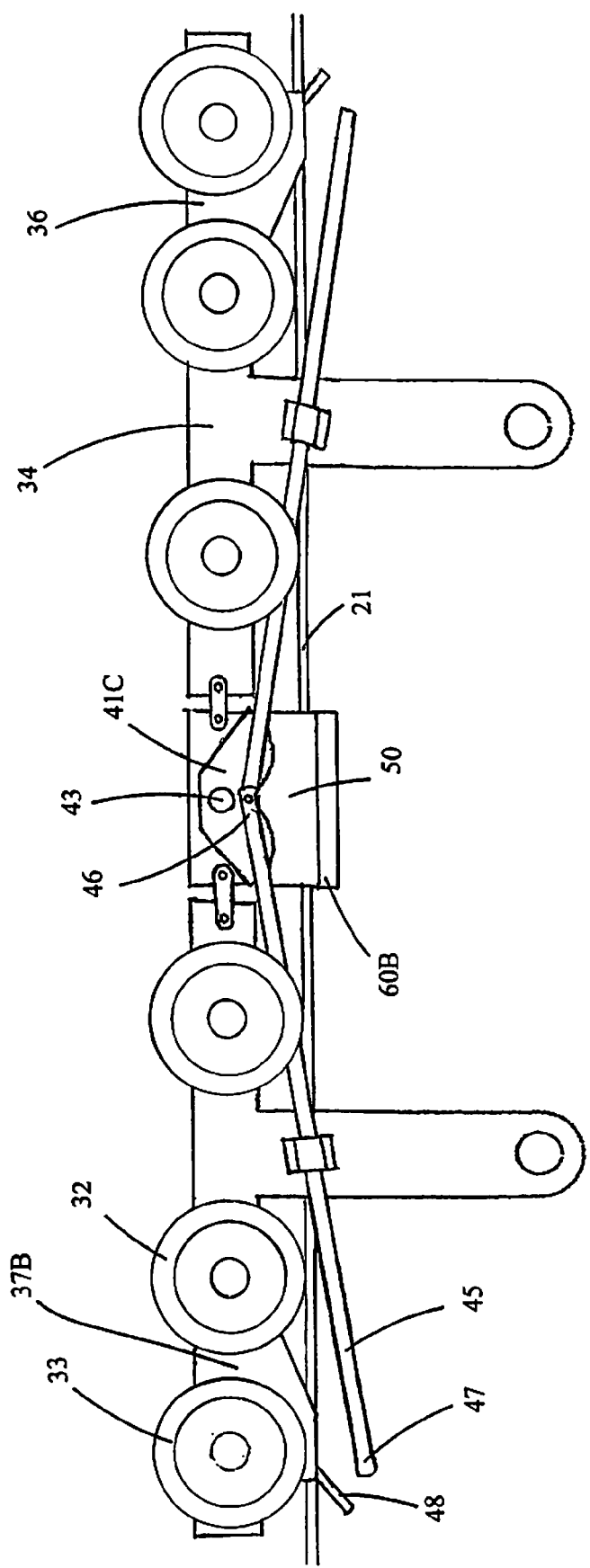
FIG. 5 is a side elevation of yet another embodiment of the inventive transport apparatus similar to the embodiment of FIG. 4, but with the gripping member positioned above the track for engaging the roller-supporting surface.
Figure 6:
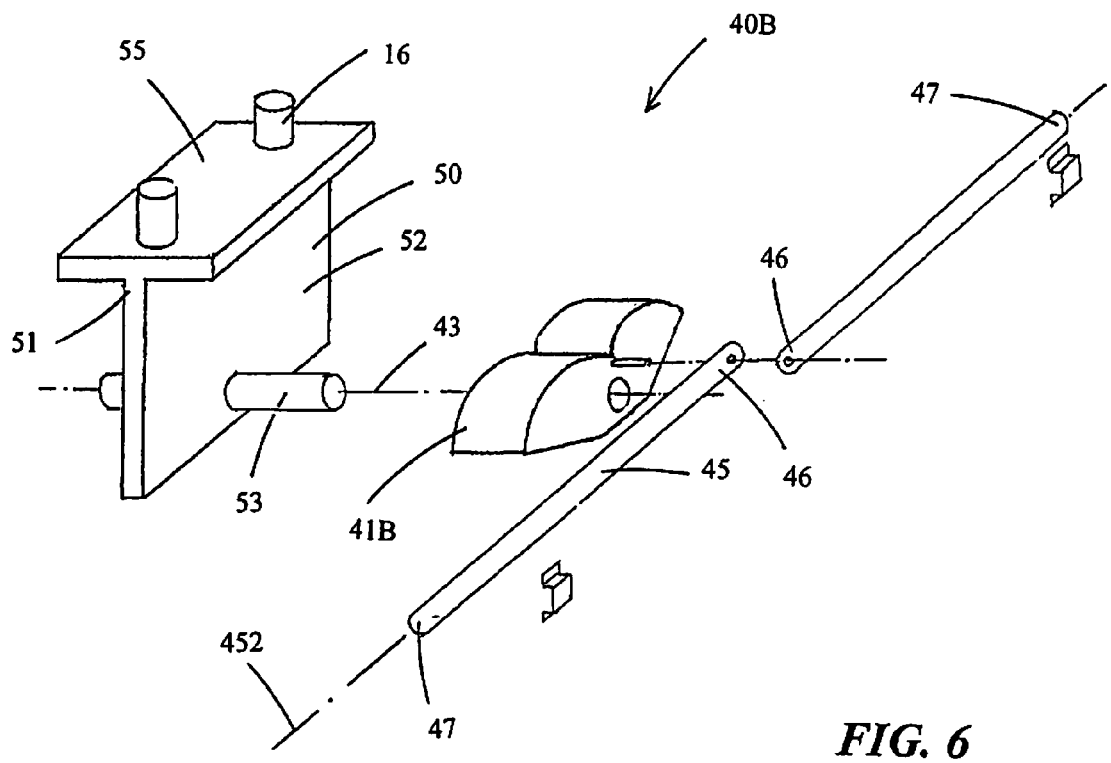
FIG. 6 is an exploded perspective view of the locking device of the embodiment of FIG. 4.
Figure 7:
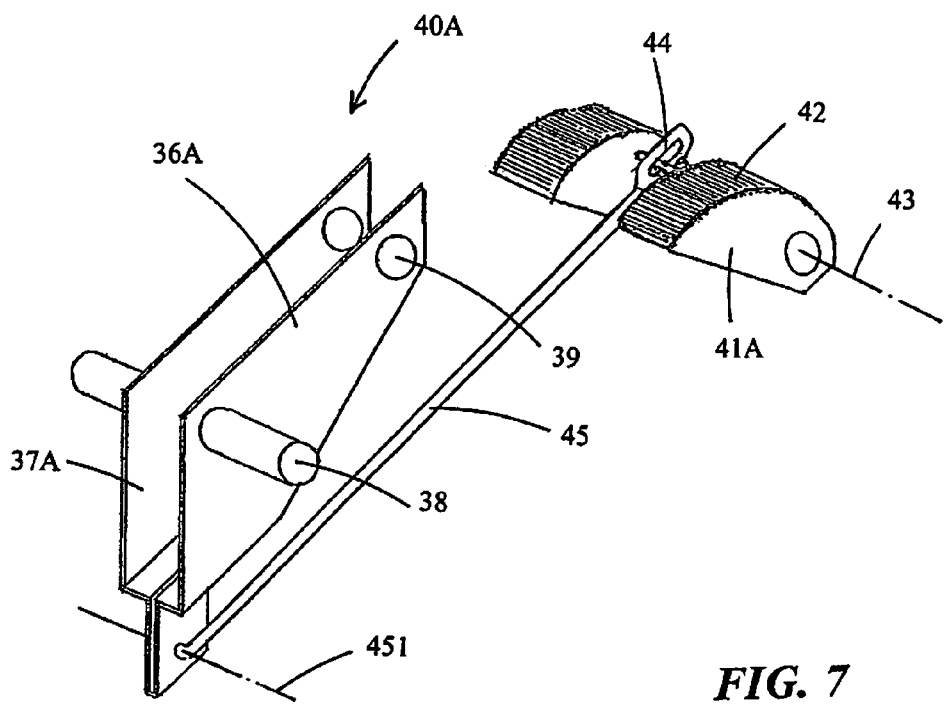
FIG. 7 is a perspective view of the locking device of the embodiment of FIG. 2.

FIGS. 6 and 7 show that locking device 40 includes a gripping member 41 pivotably secured with respect to carriage 30. FIGS. 2, 4, 5, 8 and 10 show that gripping member 41 in its non-use position is free of engagement with rail 20.

Figure 9:
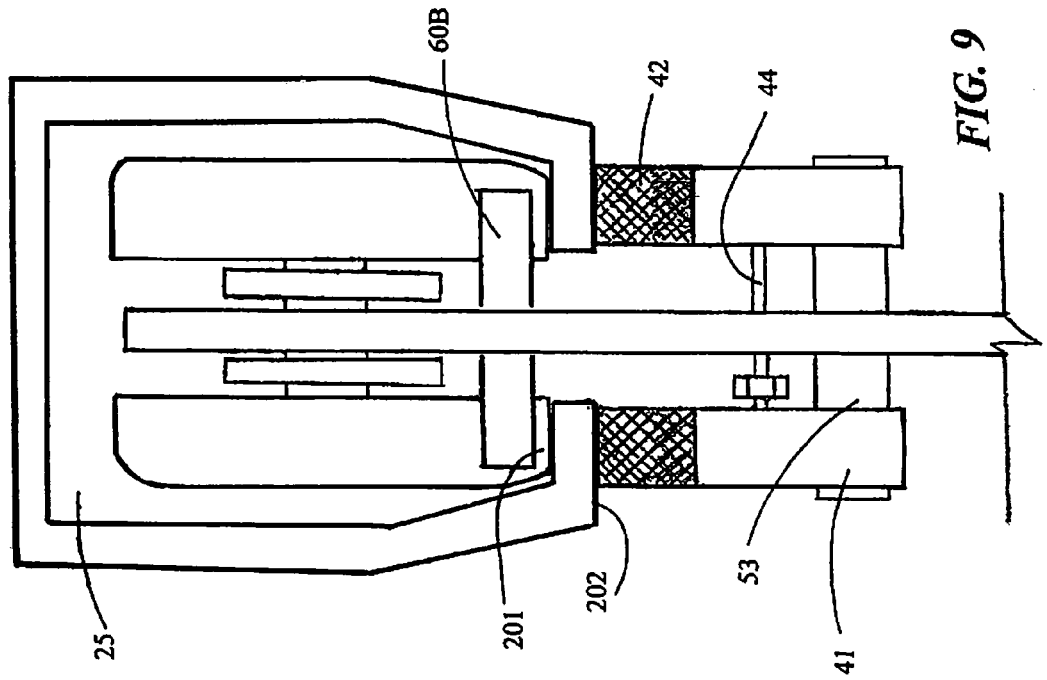
FIG. 9 is a front elevation of a fragment of the transport apparatus of FIG. 1 with the gripping member actuated by the front rollers running beyond the track.
Figure 11:
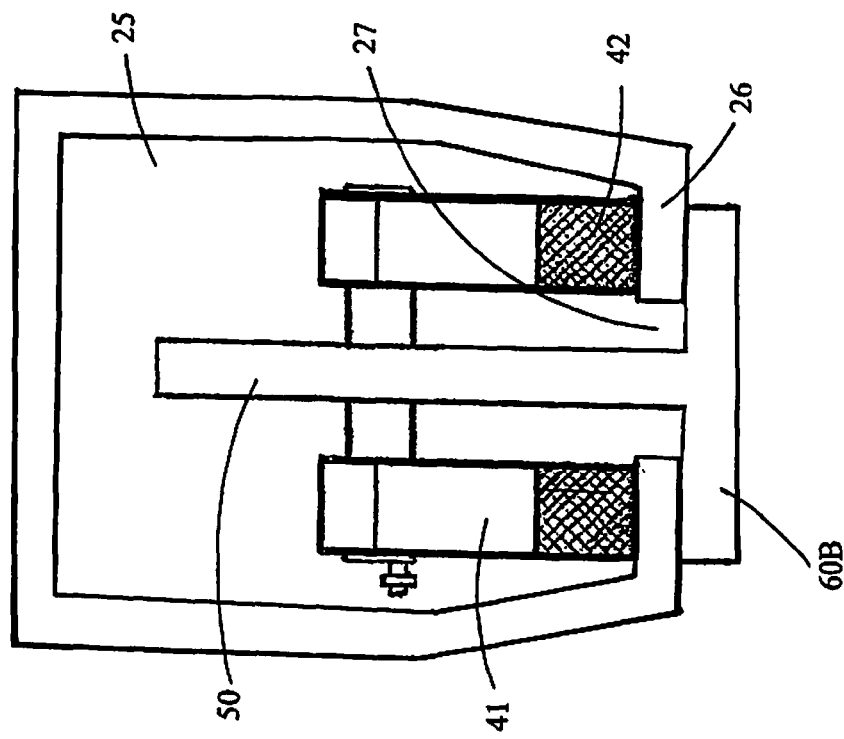
FIG. 11 is a front elevation of a fragment of the transport apparatus of FIG. 10 with the gripping member actuated by the front rollers running beyond the track.
Figure 10:
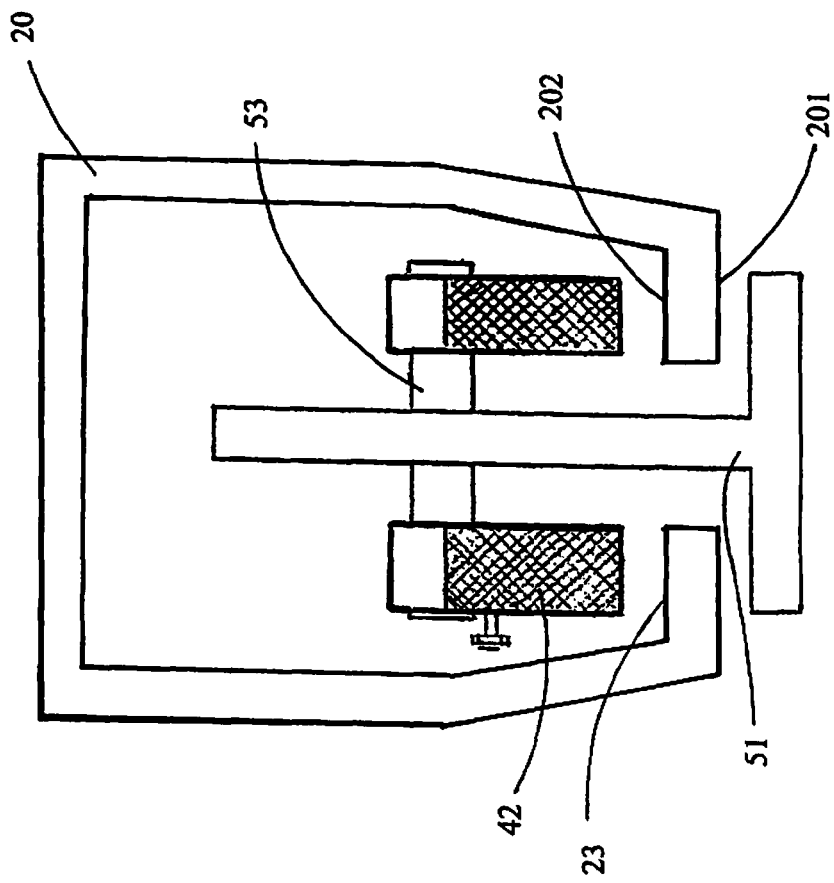
FIG. 10 is a front elevation of a fragment of the transport apparatus of FIG. 5 with all rollers on the track.

FIG. 8-11 show that track 21 includes a top surface 23 and an opposite bottom surface 24 which supports rollers 32. FIGS. 1-4, 8 and 9 show gripping member 41 positioned for pressing against bottom track surface 24. FIGS. 5, 10 and 11 show an alternative embodiment with gripping member 41 positioned inside rail 20 for gripping top surface 23 of track 21. Alternatively, the locking device may press against or otherwise engage any other surface of the rail, including a top interior surface above the rollers as well as interior or exterior of sidewalls of the rail. Such alternative arrangements may depend on the rail construction.

Locking device 40 includes a lever 45 operatively connected to gripping member 41. As seen in FIGS. 1 and 3, when front roller 33 runs beyond track-end 22, lever 45 pivots gripping member 41 against rail 20.

FIGS. 1-3 and 7 show lever 45 pivotably secured with respect to forward carriage portion 36. FIGS. 1 and 3 further show that when front roller 33 runs beyond track-end 22 (A) and forward carriage portion moves downwardly (B), then lever 45 moves (C) to pivot gripping member 41 (D) against rail 20 such that main carriage portion 34 is stopped on track 21.

Figure 4:
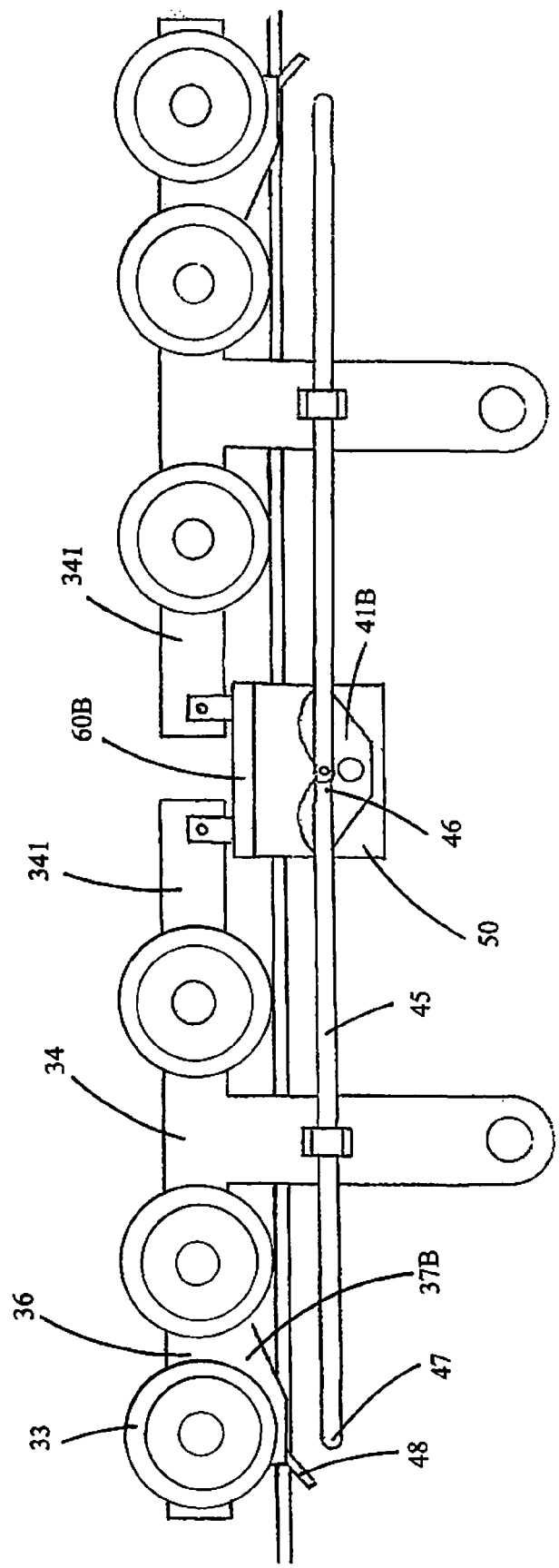
FIG. 4 is a side elevation of another embodiment of the inventive transport apparatus with a forward carriage portion at each carriage end and a locking device having one gripping member configured for being actuated by either one of the forward carriage portions.

FIGS. 4-7 show lever 45 extending from a first end 46 pivotably connected with respect to gripping member 41 to a free second end 47 positioned adjacent forward carriage portion 36. FIGS. 4 and 5 show an actuator 48 secured with respect to forward carriage portion 36. FIGS. 4 and 5 further show that, in a non-use position, actuator 48 is spaced from lever free end 47. When front roller 33 runs beyond track-end 22, downward movement of forward carriage portion 36 causes actuator 48 to engage lever free end 47 by pushing free end 47 or otherwise moving lever 45. Lever movement pivots gripping member 41 into engagement with rail 20. Once gripping member 41 engages rail 20, there is no need for lever 45 or actuator 48 to apply any additional force on gripping member 41. As seen in FIGS. 1 and 3, gripping member 41 continues to self tighten against rail 20.

FIGS. 1, 3 and 7-1 show that gripping member 41 have a serrated gripping edge 42 therealong. It is best seen in FIGS. 1-5 that gripping edge 42 extends progressively farther from the gripping-member pivot axis 43 in the forward direction A. Serrated edge 42 increases gripping-member frictional engagement of rail 20.

FIGS. 1 and 7 best illustrate that gripping member 41 further preferably includes a crossbar 44 which is affixed to gripping member 41. Crossbar 44 extends from gripping member 41 for engagement by lever 45. As seen in FIG. 1, crossbar 44 is offset from gripping-member pivoting axis 43. When downward pivot of forward carriage portion 36 actuates lever movement, lever 45 engages crossbar 44 to pivot gripping member 41 against rail 20. FIGS. 1-5 illustrate embodiments in which actuated lever 45 moves toward gripping member 41 and pushes crossbar 44 to pivot gripping member 41. Alternatively, the actuated lever may move away from the gripping member and pull the crossbar to pivot the gripping member.

FIG. 7 best shows locking device 40 including a pair of axially-aligned gripping members 41 interconnected by crossbar 44, one gripping member 41 on each side of lever 45. FIG. 7 further shows one example of forward carriage portion 36A of the embodiment illustrated in FIG. 2. Forward carriage portion 36A has a forward-portion frame 37A supporting front-roller axle 38 and defining a forward-portion pivot mounting apertures 39 through frame 37A. Apertures 39 are supported on an axle 35 of the adjacent main-portion roller 32.

FIG. 7 also shows that forward-portion frame 37A extends down from front-roller axle 38 and pivotably supports lever 45 which is operatively connected to gripping members 41 for pivoting thereof against rail 20 when front roller 32 runs beyond track-end 22.

FIGS. 4 and 5 show alternative forward-portion frame 37B which has actuator 48 is a form of a pedal extending from the forward-portion frame 37B below front roller 33. When front roller 33 runs of track 21, the pedal actuator 48 hits free end 47 of lever 45 and moves lever 45 to pivot gripping member 41.

Figure 8:
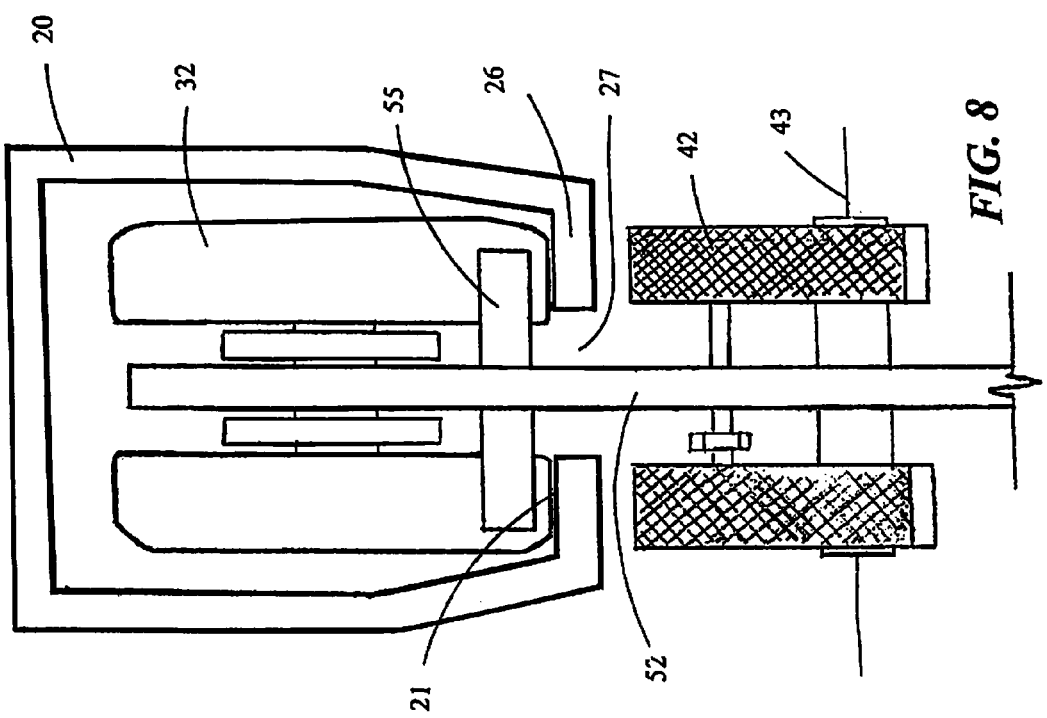
FIG. 8 is a front elevation of a fragment of the transport apparatus of FIG. 2 with all rollers on the track.

FIGS. 8-11 show that rail 20 includes an elongate interior 25 with a horizontal bottom wall 26 defining a slot 27 therethrough and forming two interior tracks 21 spaced by slot 27. Carrier device 12 is connected to carriage 30 through slot 27. As best seen in FIGS. 8 and 9, carriage 30 includes aligned pairs of interconnected rollers 32. Each roller 32 of one pair is rideable along one of the spaced interior tracks 21. If is further seen in FIGS. 8-11 that the pair of axially aligned gripping members 41 are pivotably secured with respect to carriage 30 for engagement of each track 21. It is seen in FIGS. 8 and 10 that, in there non-use position, gripping members 41 are free of engagement with rail 20.

FIGS. 3-5 show carriage 30 having two forward portions 36, one on each of opposite ends of carriage 30. In each of these embodiments, locking device 40 is operatively connected with respect to each of forward portions 36 such that downward pivoting of one of forward portions 36 causes locking device 40 to engage rail 20 thereby stopping carriage 30 on track 21.

FIG. 3 shows locking device 40A which includes two gripping members 41A. Each gripping member 41A is activated by one of forward portions 36.

FIGS. 4 and 5 show locking devices 40B and 40C each of which has only one gripping member 41B and 41C configured to engage rail 20 in response to downward pivoting of either one of forward portions 36 when its respective front roller 33 runs beyond track-end 22.

It is further seen in FIGS. 4 and 5 that locking devices 40B and 40C each include lever 45 which is operatively connected with respect to gripping member 41B, 41C and is positioned for actuation by one of forward carriage portions 36 to pivot gripping member 41B, 41C against rail 20 when front roller 33 runs beyond track-end 22. Such lever 45 has a longitudinal lever axis 452 oriented substantially along rail 20. FIG. 6 best shows that lever 45 extends from gripping member 41 to lever free end 47 positioned adjacent respective forward carriage portion 36. Lever 45B, 45C is formed of two parts, each extending from first end 46 secured with respect to gripping member 41B, 41C to free second end 47 adjacent corresponding forward carriage portion 36. First ends 46 of both lever parts are shown pivotably secured to gripping member 41 about a common pivot axis 451. It is further seen in FIGS. 4 and 5 that actuator 48 is substantially spaced from lever longitudinal axis 452 to avoid interference with the lever movement in response to downward pivot of the opposite forward carriage portion 36.

FIGS. 3-5 best show that main carriage portion 34 includes two sub-portions 341 which are movably interconnected to permit movement flexibility for suspended transport apparatus 10. In FIGS. 4 and 5, locking device 40 includes a gripping-member support structure 50A and 50B which is secured with respect to both main carriage sub-portions 341. Support structure 50 is preferably mounted with respect to each sub-portion 341 with a flexible fastening arrangement for added flexibility and resilience of such mounting. The flexible fastener may be a rubber grommet 16 seen in FIG. 6 or other similar fastener known in the art.

Gripping-member support structure 50, as seen in FIGS. 6 and 8-11, has a substantially vertical wall 51 extending through slot 27 between tracks 21. FIG. 6 best shows a gripping-member pivot axle 53 extending from vertical wall 52. FIG. 6 shows pivot axle 53 extending from both sides of the vertical wall 52 to support two gripping members 41 one on each side of vertical wall 52.

Locking safety mechanism 14 further includes a reinforcing member 60 disposed on an opposite side of rail 20 from gripping member 41 such that rail may be sandwiched between reinforcing member 60 and gripping member 41. Reinforcing member 60 is positioned at a first rail surface 201 and gripping member 41 is positioned at a second rail surface 202. First and second rail surfaces 201 and 202 are facing in opposite directions.

FIGS. 1-3 show reinforcing member 60A in the form of a bar extending substantially across first rail surface 201.

FIGS. 4-6 and 8-11 show gripping-member support structure 50 which includes a substantially horizontal wall 55 extending across an edge 51 of vertical wall 52. FIGS. 8 and 9 show horizontal wall 55 extending across upper edge 51. FIGS. 10 and 11 show horizontal wall 55 extending across lower edge 51. Horizontal wall 55 serves as reinforcing member 60B. As seen in FIGS. 8, 9 and 10, during normal operation of the transport apparatus 10 with all rollers 32 on track 21, reinforcing member 60B extends along rail 20 and is spaced from first surface 201 for riding therealong. FIG. 11 shows reinforcing member 60B and gripping member 41 sandwiching track 21 when locking device 40 is actuated by front roller 33 running off track-end 22.

In the embodiments shown in FIGS. 5, 10 and 11 with gripping member 41 positioned to engage top track surface 23, the presence of reinforcing member 60B provides greater degree of the rail engagement to stop carriage 30 on track 21. Such increased engagement is due to sandwiching of rail 20 between reinforcing member 60B and gripping member 41.

It should be understood that, while the present invention is primarily concerned with improving safety in suspended carrier apparatuses for transporting temporarily or permanently disabled persons such as hoisting devices for lifting patients or in residential setting, this invention may also be used with a wide variety of suspended transport apparatuses in many applications. Such applications may include industrial assembly lines such as in automotive manufacturing. This invention may also find its use in other suspended transport systems like funiculars or a variety of rail-utilizing attraction devices.

While the principles of the invention have been shown and described in connection with specific embodiments, it is to be understood that such embodiments are by way of example and are not limiting.

The invention claimed is:

1. In suspended carrier/transport apparatus including an overhead rail forming a horizontal track terminating at a track-end, and a carrier device supported by a carriage having a plurality of aligned rollers rideable along the track, the improvement comprising
a locking safety mechanism including:
the carriage having a main carriage portion and a forward carriage portion;
a track-end detector at the forward carriage portion and movably secured with respect thereto such that the track-end detector moves when it runs beyond the track-end; and
a locking device stopping the carriage before the track-end when the track-end detector runs beyond the track-end, the locking device being operatively connected with respect to the track-end detector such that movement thereof causes the locking device to engage the rail thereby stopping the carriage on the track.

2. The apparatus of claim 1 wherein the carrier device is a patient hoisting device.

3. The apparatus of claim 1 wherein:
the main carriage portion is along the track and the forward carriage portion is vertically movable with respect to the main portion;
the track-end detector is secured with respect to the forward carriage portion such that the forward carriage portion moves downwardly when the track-end detector runs beyond the track-end; and
the locking device is operatively connected with respect to the forward carriage portion such that downward movement thereof causes the locking device to engage the rail thereby stopping the carriage on the track.

4. The apparatus of claim 3 wherein the track-end detector is one of the aligned rollers, such aligned roller being a front roller.

5. The apparatus of claim 4 wherein the forward carriage portion is pivotably secured with respect to the main portion and pivots downwardly when the track-end detector runs beyond the track-end.

6. The apparatus of claim 1 wherein the locking device includes:
a gripping member pivotably secured with respect to the carriage such that in its non-use position the gripping member is free of engagement with the rail; and
a lever operatively connected to the gripping member and positioned for actuation by the track-end detector for pivoting the gripping member against the rail when the track-end detector runs beyond the track-end.

7. The apparatus of claim 6 wherein the gripping member has a serrated gripping edge therealong which extends progressively farther from the gripping-member pivot axis in the forward direction.

8. The apparatus of claim 7 wherein the gripping member further includes a crossbar affixed thereto and extending therefrom for engagement by the lever to pivot the gripping member against the rail.

9. The apparatus of claim 3 wherein:
the rail includes an elongate interior with a horizontal bottom wall defining a slot therethrough and forming two interior tracks spaced by the slot;
the carriage includes two interconnected pairs of aligned rollers each pair rideable along one of the spaced interior tracks, the carrier device being connected to the carriage through the slot; and
the locking device includes:
at least one axially aligned gripping member pivotably secured with respect to the carriage such that in there non-use position the gripping member is free of engagement with the rail; and
a lever operatively connected to the gripping member and positioned for actuation by the forward carriage portion for pivoting the gripping member against the rail when the track-end detector runs beyond the track-end.

10. The apparatus of claim 9 wherein the gripping member has a serrated gripping edge therealong, the gripping edge extending progressively farther from the gripping-member pivot axis in the forward direction.

11. The apparatus of claim 3 wherein:
the carriage has two of the forward portions, one on each end of the carriage; and
the locking device is operatively connected with respect to each of the forward portions such that downward movement of one of the forward portions causes the locking device to engage the rail thereby stopping the carriage on the track.

12. In suspended carrier/transport apparatus including an overhead rail forming a horizontal track terminating at a track-end, and a carrier device supported by a carriage having a plurality of aligned rollers rideable along the track, the improvement comprising
a locking safety mechanism including:
the carriage having a main carriage portion and a forward carriage portion;
a track-end detector at the forward carriage portion and movably secured with respect thereto such that the track-end detector moves downwardly when it runs beyond the track-end; and
a locking device operatively connected with respect to the track-end detector such that downward movement thereof causes the locking device to engage the rail thereby stopping the carriage on the track, the locking device pressing against the rail with increasing force as the main carriage portion moves forward with the track-end detector beyond the track-end.

13. The apparatus of claim 12 wherein the locking safety mechanism further includes a reinforcing member on an opposite side of the rail from the locking device for sandwiching the rail therebetween.

14. The apparatus of claim 12 wherein the locking device includes a gripping member pivotably secured with respect to the carriage such that in its non-use position the gripping member is free of engagement with the rail and when the track-end detector runs beyond the track-end the gripping member pivots against the rail.

15. The apparatus of claim 14 wherein the gripping member has a serrated gripping edge therealong which extends progressively farther from the gripping-member pivot axis in the forward direction.

16. In suspended carrier/transport apparatus including an overhead rail forming a horizontal track terminating at a track-end, and a carrier device supported by a carriage having a plurality of aligned rollers rideable along the track, the improvement comprising
a locking safety mechanism including:
a track-end detector operatively connected with respect to the carrier device and configured for sensing an absence of the track beyond the track-end of to stop the carrier device from falling off the track; and
a locking device secured with respect to the carrier device and operatively connected with respect to the track-end detector, the locking device stopping the carrier device before the track-end upon sensing of the absence of the track by the track-end detector.

17. The apparatus of claim 16 wherein:
the carriage has a main carriage portion along the track and a forward carriage portion vertically movable with respect to the main portion;
the track-end detector is secured with respect to the forward carriage portion such that the forward carriage portion moves downwardly when the track-end detector runs beyond the track-end; and
the locking device is operatively connected with respect to the forward carriage portion such that downward movement thereof causes the locking device to engage the rail thereby stopping the carriage on the track.

18. The apparatus of claim 17 wherein the track-end detector is one of the aligned rollers, such aligned roller being a front roller.

19. The apparatus of claim 18 wherein the forward carriage portion is pivotably secured with respect to the main portion and pivots downwardly when the track-end detector runs beyond the track-end.

20. The apparatus of claim 16 wherein the locking device presses against the rail with increasing force as the main carriage portion moves forward.

* * * * *